United States Patent [19]

D'Auria et al.

[11] 4,158,478
[45] Jun. 19, 1979

[54] COAXIAL OPTICAL FIBRE CABLE

[75] Inventors: Luigi D'Auria; Daniel Ostrowsky; André Jacques, all of Paris, France

[73] Assignee: Thomson-CSF, Paris, France

[21] Appl. No.: 815,006

[22] Filed: Jul. 12, 1977

[30] Foreign Application Priority Data

Jul. 16, 1976 [FR] France .................. 76 21816

[51] Int. Cl.² ................................ G02B 5/14
[52] U.S. Cl. .................... 350/96.23; 174/70 R
[58] Field of Search ........... 174/70 R; 350/96 B, 350/96.23

[56] References Cited

U.S. PATENT DOCUMENTS

| 2,429,670 | 1/1975 | Schubert | 350/96.23 |
| 3,865,466 | 2/1975 | Slaughter | 350/96 B |
| 4,038,489 | 7/1977 | Stenson et al. | 174/70 R |

FOREIGN PATENT DOCUMENTS 45-21231  3/1967  Japan ..................... 174/70 R

*Primary Examiner*—R. N. Envall, Jr.
*Attorney, Agent, or Firm*—Cushman, Darby & Cushman

[57] ABSTRACT

This invention provides a coaxial cable of the type comprising a central electric conductor and a peripheral electrically conducting screen separated from one another by a solid dielectric, this cable further comprising optical fibres embedded in the dielectric and symmetrically distributed between the central conductor and the peripheral screen.

1 Claim, 1 Drawing Figure

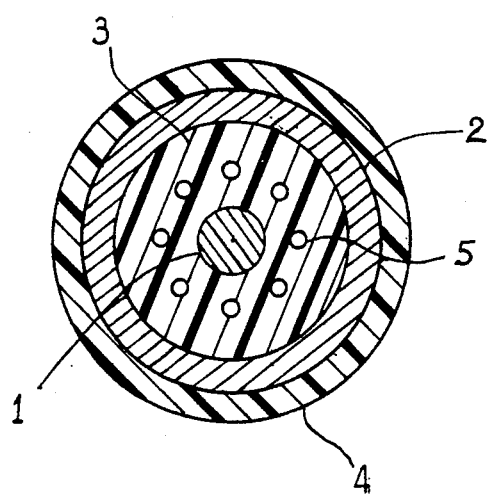

COAXIAL OPTICAL FIBRE CABLE

FIELD OF THE INVENTION

This invention relates to an electric coaxial cable of the type comprising a central conductor and a peripheral screen insulated from one another by a solid dielectric in which optical fibres are embedded.

BACKGROUND OF THE INVENTION

Cables for optical connections which contain one or more metallic fittings and which may optionally be used for transporting electrical power are already known.

In other known cables, the optical and electrical strands are disposed side by side or in coaxial groups. Since the cables used for telecommunications have appreciable diameters which increase with the cut-off frequency and inversely to the attenuation factor, the cross-section and hence the volume of these cables are not compatible with rational utilisation of which the cost is in any event prohibitive.

SUMMARY OF THE INVENTION

It is an object of the present invention to cancel these drawbacks of the prior art by providing an electrically conducting coaxial cable further comprising a plurality of optical fibres embedded in the solid dielectric part separating the central conductor and the peripheral screen.

It is a further object of the invention to provide a cable as above in which the optical fibres are disposed symmetrically around the central conductor and at equal intervals from one another.

BRIEF DESCRIPTION OF THE DRAWING

Other features and advantages of the invention will be better understood from the following detailed description when read in conjunction with the accompanying drawing in which the FIGURE diagrammatically shows an electrically conducting coaxial cable which comprises, according to the invention, a plurality of optical fibers embedded in the dielectric part.

DESCRIPTION OF A PREFERRED EMBODIMENT

The FIGURE shows a cross sectional view of a coaxial cable in which the central electric conductor 1 and the electrically conducting screen 2 are separated by a solid dielectric 3, the whole being covered by an outer protective cladding 4. Optical fibres 5 are embedded in the mass of the dielectric 3 and are distributed at regular intervals between the central conductor 1 and the screen 2.

The dimensions of the cable are determined by the electric characteristics of the coaxial cable and are only slightly modified by the insertion of the optical fiber in the solid dielectric part 3.

The geometric distribution of the fibres 5 symmetrically around the central conductor 1 and at equal intervals from one another is of primary importance so as not to create any dissymetry in the distribution of the dielectric 3. In addition, the volume of the cable is greatly reduced.

The central conductor 1 may be made of solid copper for semiflexible cables and of several strands for flexible cables. The outer conductor or screen 2 is formed by one or more superposed braidings consisting of fine copper wires.

Dielectrics which are perfectly suitable for the cable according to the invention include polyethylene, polyethylene terephthalate and polystyrene used in compact or cellular form.

The outer cladding 4 is advantageously made of polyvinyl chloride.

The cable according to the invention represents a transition between existing transmissions by coaxial cables with standardized electronic equipment and the more recent optoelectronic transmissions for which it is sufficient to modify the terminal installations without altering the cables.

This type of cable may be used with advantage for optical or electrical transmissions, depending on whether or not the environment is affected by parasitic electromagnetic phenomena.

What we claim is:

1. A coaxial cable comprising a central electric conductor, a peripheral electrically conducting screen, a solid dielectric separating from one another said central conductor and said screen and a plurality of optical fibres embedded in said dielectric and distributed between said central conductor and said screen, said optical fibres being arranged symmetrically around the central conductor and at equal intervals from one another.

* * * * *